US008559931B2

(12) United States Patent
Moon et al.

(10) Patent No.: US 8,559,931 B2
(45) Date of Patent: Oct. 15, 2013

(54) APPLICATION SUGGESTIONS FOR MOBILE COMMUNICATION DEVICE BASED ON LOCATION-BASED DIRECTORY INFORMATION

(75) Inventors: Hannah Youngsil Moon, Boston, MA (US); Dorothy Beau Morley, Wakefield, MA (US); Kathryn Mary Dobroth, Jamaica Plain, MA (US)

(73) Assignee: Cellco Partnership, Basking Ridge, NJ (US)

( * ) Notice: Subject to any disclaimer, the term of this patent is extended or adjusted under 35 U.S.C. 154(b) by 297 days.

(21) Appl. No.: 12/612,318

(22) Filed: Nov. 4, 2009

(65) Prior Publication Data

US 2011/0105150 A1    May 5, 2011

(51) Int. Cl.
*H04M 3/42* (2006.01)
*H04W 24/00* (2009.01)
*G06Q 30/00* (2012.01)

(52) U.S. Cl.
USPC ............. 455/414.2; 455/456.1; 705/14.4; 705/14.49; 705/14.58; 705/14.64

(58) Field of Classification Search
USPC ........... 455/456.1–456.3, 456.6–457, 414.2; 705/14.4, 14.9, 14.54, 14.58, 14.64, 705/26.1
See application file for complete search history.

(56) References Cited

U.S. PATENT DOCUMENTS

| 8,099,332 B2 * | 1/2012 | Lemay et al. ............... 705/26.1 |
| 2002/0122055 A1 * | 9/2002 | Parupudi et al. ............ 345/737 |
| 2004/0203863 A1 | 10/2004 | Huomo |
| 2005/0255861 A1 | 11/2005 | Wilson et al. |
| 2008/0113614 A1 * | 5/2008 | Rosenblatt .................. 455/3.05 |
| 2008/0268868 A1 * | 10/2008 | Maitland ..................... 455/456.1 |
| 2009/0247140 A1 * | 10/2009 | Gupta et al. ................ 455/418 |
| 2010/0120450 A1 * | 5/2010 | Herz .......................... 455/456.3 |
| 2010/0153201 A1 * | 6/2010 | De Rubertis et al. ....... 705/14.19 |
| 2011/0219226 A1 * | 9/2011 | Olsson et al. ............... 713/150 |

FOREIGN PATENT DOCUMENTS

| EP | 2 073 498 A1 | 6/2009 |
| WO | WO 2009/083719 A1 | 7/2009 |

OTHER PUBLICATIONS

Extended European Search Report issued in European Patent Application No. 10014300.7-2413, dated Mar. 31, 2011.
Tadanobu Tsunoda et al., "Location Based Query Routing for Distributed Spatial Data in Mobile Ad Hoc Network," Information and Telecommunication Technologies, 2008, 7th Asia-Pacific Symposium on, IEEE, Apr. 2008, pp. 241-246, XP031350283.

* cited by examiner

*Primary Examiner* — Wesley Kim

(57) ABSTRACT

A mobile communication device may include a mobile communication system configured to facilitate wireless mobile communications. A location sensing system may be configured to sense the location of the mobile communication device. A location-based points of interest application may be configured to locate points of interest within the vicinity of the mobile communication device based on the location of the mobile communication device. An application mapping application may be configured to locate user applications that are relevant to the points of interest within the vicinity of the mobile communication device. A user interface may be configured to present links to the user applications.

24 Claims, 4 Drawing Sheets

APPLICATION SUGGESTIONS FOR MOBILE COMMUNICATION DEVICE BASED ON LOCATION-BASED DIRECTORY INFORMATION

BACKGROUND

1. Technical Field

This disclosure relates to downloadable applications for wireless mobile communication devices, such as cell phones.

2. Description of Related Art

Many mobile communication devices now have the ability to run a broad variety of specialized applications and to allow the user to select and download ones that are of interest.

This added functionality has led to application stores, that is, servers which maintain inventories of applications for purchase and download. Examples include the iPhone Apple Store, Blackberry's RIM Store, Nokia's OVi Store, and Verizon Wireless' upcoming V-CAST Store.

As a consequence of these developments, the number of downloadable applications has risen dramatically. Unfortunately, there are now so many downloadable applications that a user may have difficulty locating ones that are of interest.

Methods do exist for helping users locate downloadable applications of interest. These include keyword searching, "most popular" lists, and category browsing. Unfortunately, these approaches may require the user to spend time searching for desirable applications. They also may not do an effective job at reducing the number of applications which are presented to the user and/or at proposing the most relevant ones. These approaches may not even be of much help to a user that is not even aware of a particular type of relevant application. These approaches also may not take into consideration the personal interests or circumstances of a user.

SUMMARY

A mobile communication device may include a mobile communication system configured to facilitate wireless mobile communications. A location sensing system may be configured to sense the location of the mobile communication device. A location-based points of interest application may be configured to locate points of interest within the vicinity of the mobile communication device based on the location of the mobile communication device. An application mapping application may be configured to locate user applications that are relevant to the points of interest within the vicinity of the mobile communication device. A user interface may be configured to present links to the located user applications.

The location-based points of interest application may be configured to locate the points of interest based on metadata indicative of at least one classification for each service. Each user application may be associated with metadata that is indicative of at least one classification for each user application. The metadata may be descriptive of points of interest to which each user application is relevant. The application mapping application may be configured to locate the user applications based on matches between the points of interest metadata and the user application metadata.

The location-based points of interest application may be configured to locate the points of interest by querying a server that is not part of the wireless mobile communication device.

The application mapping application may be configured to locate user applications by querying a server that is not part of the wireless mobile communication device.

The location-based points of interest application may be configured to locate points of interest which include local business, such as restaurants and/or retail stores.

The user interface may be configured to present a user-selectable icon which, when selected by a user, causes a link to be displayed to a server at which the user may acquire one of the user applications.

The application mapping application may be configured to locate user applications without requiring any personal information about a user.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
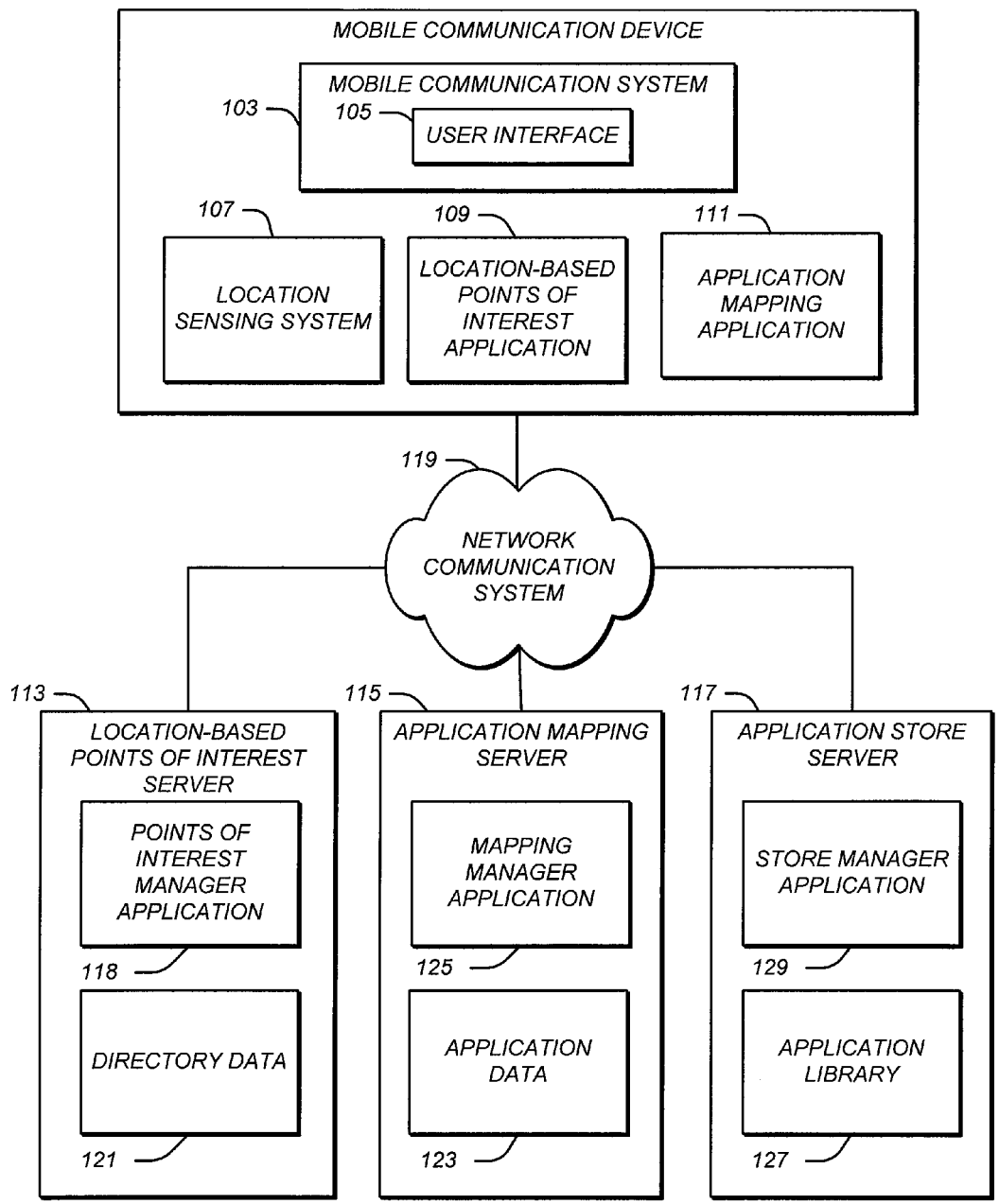
FIG. 1 is a block diagram of a mobile communication device, an associated network communication system, and related servers, all configured to provide application suggestions based on location-based directory information.

FIG. 1 is a block diagram of a mobile communication device, an associated network communication system, and related servers, all configured to provide application suggestions based on location-based directory information.

As illustrated in FIG. 1, a mobile communication device 101 may be configured to communicate with a location-based points of interest server 113, an application mapping server 115, and an application store server 117. A network communication system 119 may be configured to facilitate this communication.

The mobile communication device 101 may include a mobile communication system 103, a location sensing system 107, a location-based points of interest application 109, and an application mapping application 111.

The mobile communication system 103 may be configured to facilitate communication between the mobile communication device 101, one or more of the servers 113, 115, and 117, and other communication devices, such as other mobile communication devices and servers.

The mobile communication system 103 may be of any type. For example, it may include a transmitter, a receiver, one or more data processing sub-systems, and/or other components. The mobile communication system 103 may include a user interface 105, which may include any type of user interface device, such as a microphone, loud speaker, headphone, earphone, display (including touch screen), mouse, and/or keyboard.

The location sensing system 107 may be configured to sense the location of the mobile communication device 101. The location sensing system 107 may be of any type. For example, it may include a GPS chip set configured to determine the geographic location of the mobile communication device 101 based on positioning signals from global satellites. The location sensing system 107 may in addition or instead include an architecture that uses both GPS as well as network elements to determine position (AGPS). The location sensing system can in addition or instead use cell tower triangulation to determine position based on the nearest cell tower ID.

The location-based points of interest application 109 may be configured to locate points of interest within the vicinity of the mobile communication device 101, based on the location of the mobile communication device 101. Local points of interest may include all local business, such as retail stores and restaurants, all listings in Yellow Pages, local social networking opportunities, and/or GPS navigational points of interest. To facilitate this functionality, the location-based points of interest application 109 may be configured to send a query to one or more location-based points of interest servers for these local points of interest. The location-based points of interest application 109 may be configured to utilize the mobile communication system 103 for the purpose of sending these queries and receiving responses from them.

The queries which the location-based points of interest application 109 is configured to send may include a broad variety of information, such as information identifying the mobile communication device 101, the current location of the mobile communication device 101 as sensed by the location sensing system 107, and information relating to the identity of the server or other communication system to which the query should be delivered.

The location information may be in any form. For example, it may consist of or include geographic coordinates, as determined by the location sensing system 107, such as longitude and latitude. Altitude may or may not be part of this information. A street address may in addition or instead be sent.

The queries which the location-based points of interest application 109 is configured to send may or may not include information about the types of location-based points of interest which are desired. For example, the queries may or may not specify an interest in only certain types of local points of interest, such as business, retail stores, restaurants, listings in Yellow Pages, local social networking opportunities, and/or GPS navigational points of interest. The location-based points of interest application 109 may be configured to allow a user to specify these points of interest types through the user interface 105.

The queries which the location-based points of interest application 109 are configured to send may or may not also specify a distance which defines what is or is not to be considered as local. For example, the queries sent by the location-based points of interest application 109 may specify a range of one mile, one-half mile, one quarter mile, at the current location only, or some other distance limitation. The location-based points of interest application 109 may be configured to allow a user to specify this distance limitation through the user interface 105.

The location-based points of interest application 109 may be configured to issue each query upon request of a user through the user interface 105 or in accordance with a pre-programmed schedule.

The location-based points of interest application 109 may be configured to address each request to one or more location-based points of interest servers, such as to the location-based points of interest server 113. The location-based points of interest application 109 may be configured to allow a user, carrier, or other entity to specify these server addresses. When the location-based points of interest application 109 is configured to send the queries to multiple servers, the location-based points of interest application 109 may be configured to consolidate the responses which are received.

One or more servers may be configured to respond to that are sent by location-based points of interest applications, such as the location-based points of interest application 109. One example of such a server is the location-based points of interest server 113.

The location-based points of interest server 113 may include directory data 121. The directory data may include information about any of the types of points of interest that are identified above, as well as about any other types of points of interest. For each service, the information may include the name of the service, a description of the service, the location of the service, such as its street address and/or longitude and latitude, and a telephone number. If only a street address is stored, a mapping application (not shown) may be used to determine its longitude and latitude, or vice versa. The information about each service may include metadata which is indicative of at least one classification for the service. For example, the metadata might include one or more tags that are descriptive of the service.

McDonald's, for example, might be tagged with metadata such as "restaurant", "fast food", and/or "American food." These tags may be the same as are used to categorize the service in a telephone directory. These tags may be obtained from such a directory by looking up the particular service organization and its associated classification(s) in the directory.

The location-based points of interest server 113 may include a points of interest manager application 118. The points of interest manager application 118 may be configured to receive queries from location-based points of interest applications, such as the location-based points of interest application 109. It may be configured to query the directory data 121 for information about points of interest that are local to the mobile communication device 101, based on the location information contained in the query. The distance limitation that defines when a service is local may be specified by a parameter which is internal to the location-based points of interest application or which is part of the received query. The points of interest manager application 118 may be configured to return the matching information that is located within the directory data 121 to the querying location-based points of interest application 109. All or portions of the matching information may be returned, such as the name of the service, the description of the service, its location, its phone number, and/or the metadata about the service, such as its tags. The points of interest manager application 118 may also be configured to calculate how far each matching local service is from the current location of the mobile communication device and to return this information as well.

Upon receiving information responsive to a query, the location-based points of interest application 109 may be configured to present all or portions of this information to a user through the user interface 105. For example, the location-based points of interest application 109 may be configured to display a list of the names of the local points of interest. The list may include the location of the local service, including how far it is from the current location of the mobile communication device 101, the descriptive information about the service, and/or its phone number. The location-based points of interest application 109 may be configured to calculate the distance to each local service from the current location of the mobile communication device 101, if this information is not provided by the location-based points of interest server 113.

The location, descriptive information, and/or phone number for each service may instead be made available on a different screen. The different screen may be linked to the name of the service on the list, thereby avoiding screen clutter, while still permitting the user to obtain this additional information.

All or portions of the information which is returned from the location-based points of interest server 113 may also be delivered to the application mapping application 111.

The application mapping application 111 may be configured to locate user applications that are relevant to the local points of interest. The application mapping application 111 may be configured to locate these relevant applications by delivering a query to one or more application mapping servers, such as to the application mapping server 115. The application mapping application 111 may be configured to utilize the mobile communication system 103 for the purpose of sending these queries and receiving responses from them.

Each query may include information about one or more of the local points of interest which has been received from the location-based points of interest server 113, such as the metadata that may be associated with one or more of these local points of interest, such as the tags. The application mapping application 111 may be configured to include all of the metadata about all of the local points of interest in a single query, in a separate query for each local service, or in some other arrangement of queries. Each query may include information identifying the mobile communication device 101 and the application mapping servers to which the query should be delivered, such as to the application mapping server 115.

When the application mapping application 111 issue queries for relevant applications to several application mapping servers, the application mapping application 111 may be configured to consolidate the responses which are received.

The application mapping application 111 may be configured to allow the address or addresses of the targeted application mapping servers to be programmed by a user through the user interface 105, a carrier, and/or any other another entity.

The application mapping application 111 may be configured to issue each query upon receiving new information from a location-based points of interest server about the identity of a local service, upon command by a user, on a periodic basis, and/or in accordance with some other timing scheme.

The application mapping server 115 may include application data 123. The application data 123 may include information about various applications which may be downloaded and executed by the mobile communication device 101. For each application, this information may include the name of the application, a description of the application, the cost of the application, and/or metadata relating to the application. This information may also include information about where a copy of the application may be downloaded, such as one or more URL addresses of locations within application store servers at which the application may be downloaded, such as the application store server 117.

The metadata which is associated with each application in the application data 123 may include one or more tags which are descriptive of points of interest to which the application may be relevant. For example, applications that provide games, video clips, travel guides, or duty-free catalogs may each be associated with the tag "airport," since each of these applications may be relevant to a person who is at or is going to an airport. Similarly, applications that calculate waiter tips, provide restaurant reviews, provide nutritional guides, or translate words may each be associated with the tag "restaurant," since each of these applications may be relevant to a person who is at or is going to a restaurant. Another example is the tag "grocery store" for coupon applications, nutritional applications, price comparison applications, and loyalty card applications.

A single application may have multiple tags associated with it. For example, a video game application may have the tags "airport," "bus terminal," and "train" associated with it.

When tags are associated with local points of interest in the directory data 121 and with applications in the application data 123, the tags may all be restricted to a common set of words, such as to the descriptive classifications used in a telephone directory for the points of interest.

The application mapping server 115 may include a mapping manager application 125. The mapping manager application 125 may be configured to receive queries for applications from application mapping applications in mobile communication devices, such as the application mapping application 111. The mapping manager application 125 may be configured to query the application data 123 for applications which have metadata which matches the metadata associated with the local points of interest, as contained with the query. When the metadata is tags and when there are multiple tags, a match may be designated when only one of these tags match, when only all of them match, or when some other combination of them matches. In other embodiments, the mapping manager application 125 may in addition or instead be configured to match all or a portion of the title and/or the description of the local service with all or a portion the title and/or the description of the applications in the application data 123.

The mapping manager application 125 may be configured to return information about the matching applications which are found in the application data 123 to the application matching application in the mobile communication device which sent the query, such as the title of the application, the description of the application, the cost of purchasing the application, and/or the location or locations from which the application may be downloaded.

Application providers may pay fees in connection with their applications for the purpose of causing their applications to be listed within the application data 123 or for the purpose of causing their applications to receive a preference over other applications of the same type which may also be listed in the application data 123. The preference may include a higher ranking or another form of emphasis in the list that may be delivered in connection with the application to the querying application mapping application in the mobile communication device.

The application mapping application 111 may be configured to receive information about matching applications from the application mapping server 115. The application mapping application 111 may be configured to cause all or portions of this information to be communicated to a user through the user interface 105.

For example, the application mapping application 111 may be configured to cause a list of the matching applications to be displayed. The list may include information such as the title of the application, the description of the application, the cost of downloading the application, and a location from which the application may be purchased. The description, cost, and location information may instead be on a separate screen which is linked to the title of each application of the list, thereby minimizing display clutter.

Some of the listed applications may already be loaded within the mobile communication device 101, while others may not. In this situation, the application mapping application 111 may be configured to differentiate between these two classes of applications by segregation, emphasis, and/or by other means.

If a listed application is already loaded within the mobile communication device 101, the application mapping application 111 may be configured to link the name of the application to the executable file for the application, so that the application runs when its name on the list is selected.

If the matching application is not already loaded within the mobile communication device 101, the application mapping application 111 may instead be configured to link the name of the application on the list to an application store server at which the application may be purchased and downloaded, such as to the application store server 117. The application mapping application 111 may be configured to instead link the name of the application to a list of application store servers at which the application may be obtained and to receive a selection from the user of one of stores on the list.

Upon the user selecting a listed application or a listed application store server for an application which is not already loaded within the mobile communication device 101, the application mapping application 111 may be configured to automatically download the selected application from the application store and to cause the user to be charged for it. The application mapping application 111 may instead be configured to present the user with one or more dialog boxes, such as a dialog box seeking confirming that the user wishes to purchase the application for a listed price.

The application store server 117 may be configured to receive requests for applications from application mapping applications in mobile communication devices, such as from the application mapping application 111, and download the requested applications into the mobile communication devices.

The application store server 117 may include an application library 127. The application library 127 may include a set of applications, each one of which may be purchased, downloaded, and used by a user.

The application store server 117 may include a store manager application 129. The store manager application 129 may be configured to manage all aspects of an application purchase transaction. For example, the store manager application 129 may be configured to obtain a requested application from the application library 127, to process billing and/or payment related to the purchase of the application, and/or to download that application to the requesting mobile communication device. The store manager application 129 may be configured to perform these task automatically without further input from the user or may present the user with one or more dialog boxes, such as a box requesting confirmation of the purchase transaction.

Although indicated as being separate, the application store server 117 may be part of the application mapping server 115, or vice versa.

Once the selected application has been purchased from the application store server 117 and downloaded into the mobile communication device 101, the downloaded application may be installed and used by the user. The application mapping application 111 may be configured to automatically run a newly-installed application that has been selected from a list provided by the application mapping application 111 or to wait for a user to request that the newly-downloaded application be executed.

The network communication system 119 may be configured to facilitate communication between mobile communication devices, such as the mobile communication device 101, and servers, such as the location-based points of interest server 113, the application mapping server 115, and/or the application store server 117. The network communication system 119 may have any configuration to facilitate this functionality. For example, the network communication system 119 may include one or more mobile communication networks, the internet, one or more gateways, one or more local area networks, and/or one or more wide area networks.

FIGS. 2a-2e illustrate a sequence of screens on a mobile communication device that provide application suggestions based on location-based directory information.

Figure 2A:
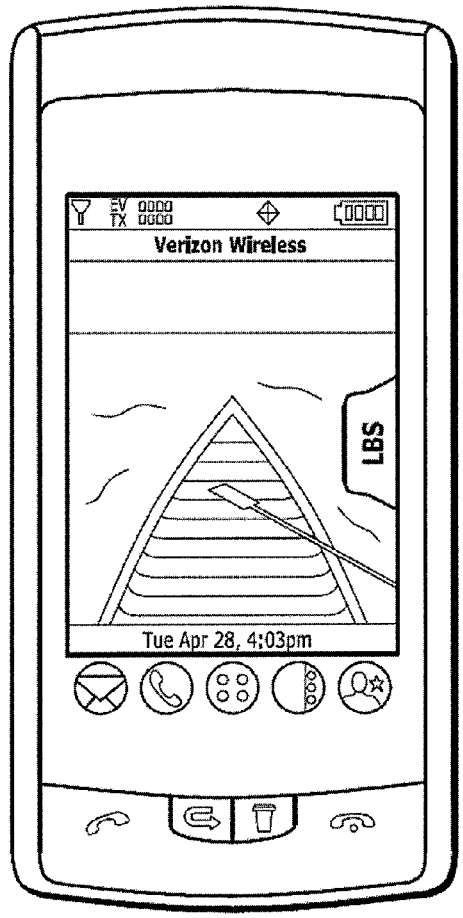
FIGS. 2a-2e illustrate a sequence of screens on a mobile communication device that provide application suggestions based on location-based directory information.

FIG. 2a illustrates a mobile communication device displaying a home screen on a display. As illustrated in FIG. 2, the home screen may include a tab designated "LBS," signifying location based points of interest. Other types of icons, user-interfaces, and/or designations may be used in addition or instead, such as adding a "LBS" icon on the Applications screen or within a mapping application, such as VZNavigator or Google Maps.

Upon selecting the LBS tab, the location-based points of interest application 109 may be configured to query a location-based points of interest server, such as the location-based points of interest server 113, for information about local points of interest, as described above. Upon receiving this information, the application mapping application 111 may, in turn, be configured to query an application mapping server, such as the application mapping server 115, for information about relevant applications, as also described above.

Figure 2B:
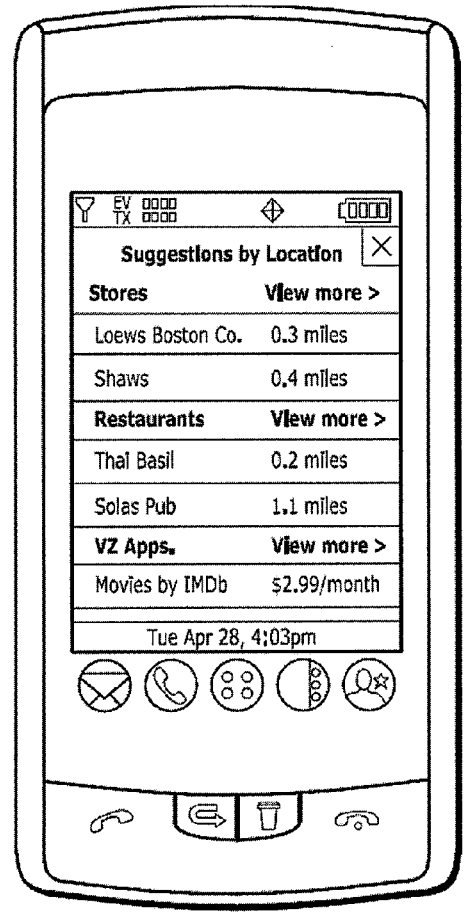

FIG. 2b illustrates a screen which may display after a user selects the LBS tab in FIG. 2a. This screen may be assembled using the information about the local points of interest which is received from the location-based points of interest server 113 and the information about the relevant applications which is received from the application mapping server 115.

As illustrated in FIG. 2b, the screen may list the local points of interest, organized by type. These types may be based on the tags that may be associated with the local points of interest. Distances from the mobile communication device may also be displayed.

Applications relevant to one or more of these local points of interest may also be listed. As illustrated in FIG. 2b, they may be listed under a separate category, such as "VZ Apps" (standing for "Verizon Applications"), along with the price for each.

As illustrated in FIG. 2b, only a few results may be provided for each listed category. A "View More" link may be provided in connection with each to see more. Vendors may pay to have their points of interest and/or applications listed or to have them listed with a higher priority or degree of prominence.

Figure 2C:

FIG. 2c illustrates a screen which may be displayed if the user selects one of the local points of interest which are listed in FIG. 2b, such as "Shaws." As illustrated in FIG. 2c, various information about the local service may be provided, such as the name of the local service, an address, store hours, a telephone number, a button for calling the store, and a descriptive category.

If the calling button is selected, the mobile communication device may be configured to place a call to that local service at the listed number.

As also illustrated in FIG. 2c, a list of the applications which are relevant to the local points of interest may be provided under a separate heading, such as "Suggested VZ Apps" ("VZ" standing for Verizon), along the price for each.

Figure 2D:

A user may select one of the listed applications, such as GroceryIQ. FIG. 2d illustrates a screen which may appear if the user selects the "Grocery IQ" application. As illustrated in FIG. 2d, the name of the application may be displayed, along with the descriptive information about the application, the price of downloading the application, and a "Buy App" button that is configured to enable the user to purchase and download the application.

If the "Buy App" button is selected, the application may be automatically downloaded and installed in the mobile communication device 101, and the user may be billed for the purchase. Alternatively, the user may be taken to one or more screens at an application store server at which the application may be purchased, such as to the application store server 117.

Figure 2E:
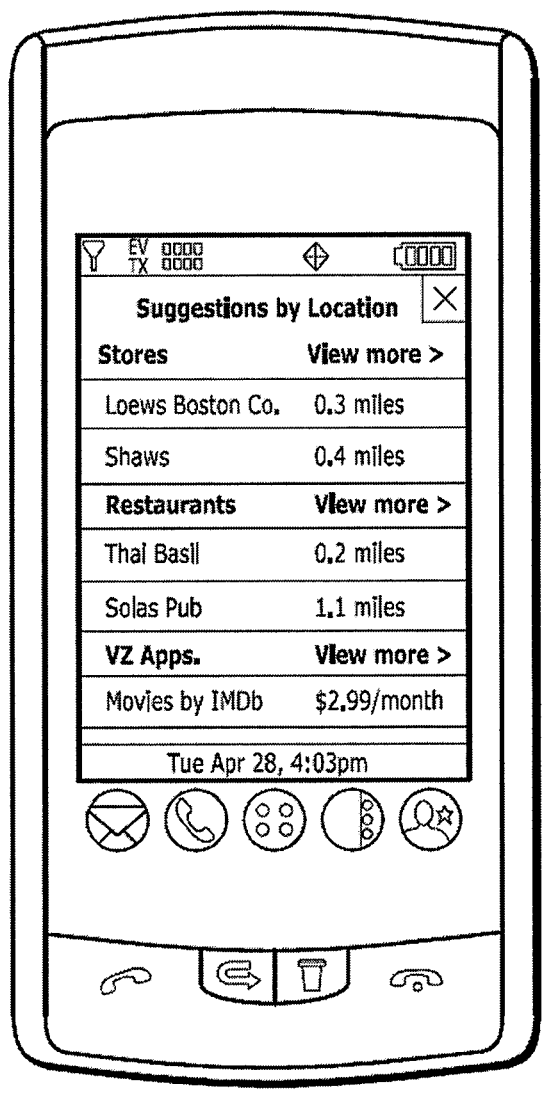

While at the screen illustrated in FIG. 2b, a user may instead select a listed application, such as "Movies by IMDB" This is illustrated in FIG. 2e. Upon making such a selection, a screen comparable to the one illustrated in FIG. 2d may be displayed and may function in the same way.

Different types of user interfaces may be used to communicate local points of interest and relevant applications and to facilitate their selection.

The various applications which have been discussed, such as the location-based points of interest application, the application mapping application, the points of interest manager application, application manager application, and the store manager application, may each consist of computer-readable programming instructions software stored on computer-readable media. The instructions may include one or more algorithms specifically written to implement each of the functions of each application which have been described herein, as well as other functions.

The computer-readable storage media may be of any type, including one or more RAMS, ROMS, ePROMS, flash memories, CD's, DVD's, hard disk drives, and/or any combination of them. One or more of these applications may be initially stored on one type of computer-readable storage media, such as ROMS, ePROMS, flash memories, CD's, DVD's, and/or hard disk drives, and transferred to another type in whole or in part, such as RAM, during execution.

The components of the location-based points of interest server, the application mapping server, and/or the application store server may either be separate from the mobile communication device 101, as illustrated in FIG. 1, or part of the mobile communication device 101. For example, the mobile communication device 101 may include the points of interest manager application 118, the directory data 121, the mapping manager application 125, and/or the application data 123.

The application suggestions which have now been described based on location-based directory information may be provided without the user supplying any personal information about the user.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, within the Application store itself, there may be an option to view applications related to one's location, just like there's an option for "Most Popular." Or within a mapping application, whenever a map shows a business listing, the map may also list the associated applications.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

We claim:

1. A mobile communication device comprising:
    a mobile communication system configured to facilitate wireless mobile communications;
    a location sensing system configured to sense the location of the mobile communication device;
    a location-based services application configured to locate services within the vicinity of the mobile communication device based on the location of the mobile communication device;
    an application mapping application configured to locate user application programs that can be executed by the mobile communication device and that are relevant to the services within the vicinity of the mobile communication device, wherein the application mapping application is configured to:
    transmit, through the network to a plurality of application mapping servers, queries for application programs related to the services located by the location-based services application, each query identifying at least one of the services, and each query including information identifying an application mapping server of the plurality of application mapping servers to which the query should be delivered;
    receive responses from the plurality of application mapping servers including information about application programs relevant to the services identified in the queries;
    identify whether any of the application programs relevant to the services identified in the queries are already loaded for execution within the mobile communication device; and
    consolidate the responses from the plurality of application mapping servers for presentation by a user interface, the user interface being configured to present links to the user application programs, based on the received information, where the links differentiate between a first user application program identified as already loaded within the mobile communication device and a second user application program identified as not already loaded within the mobile communication device.

2. The mobile communication device of claim 1 wherein the location-based services application is configured to locate the services based on metadata indicative of at least one classification for each service.

3. The mobile communication device of claim 2 wherein the user application programs are each associated with metadata that is indicative of at least one classification for each user application program.

4. The mobile communication device of claim 3 wherein the metadata associated with each user application program is descriptive of services to which each user application program is relevant.

5. The mobile communication device of claim 3 wherein the application mapping application is configured to locate the user application programs based on matches between the services metadata and the user application program metadata.

6. The mobile communication device of claim 1 wherein the location-based services application is configured to locate the services by querying a server that is not part of the wireless mobile communication device.

7. The mobile communication device of claim 1 wherein the location-based services application is configured to locate services which include local restaurants.

8. The mobile communication device of claim 1 wherein the location-based services application is configured to locate services which include local retail stores.

9. The mobile communication device of claim 1 wherein the user interface is configured to present a user-selectable icon which, when selected by a user, causes a link to be displayed to a server at which the user may acquire the second user application program identified as not already loaded within the mobile communication device.

10. The mobile communication device of claim 1 wherein the application mapping application is configured to locate user application programs without requiring any personal information about a user.

11. The mobile communication device of claim 1 wherein the application mapping application is further configured to download the located second user application program identified as not already loaded within the mobile communication device and to cause the located second user application program to be executed by the mobile communication device.

12. The mobile communication device of claim 1 wherein the link to the second user application program identified as not already loaded within the mobile communication device is a link to a server from which the second user application program may be downloaded, and the link to the first user application program identified as already loaded within the mobile communication device is a link to an executable file for running the first user application program on the mobile communication device.

13. Non-transitory computer-readable storage media containing computer-executable programming instructions which, when read and executed by a mobile communication device having a mobile communication system configured to facilitate wireless mobile communications, a location sensing system configured to sense the location of the mobile communication device, and a user interface, cause the mobile communication device to:

locate services within the vicinity of the mobile communication device based on the location of the mobile communication device;

locate user application programs that can be executed by the mobile communication device and that are relevant to the services within the vicinity of the mobile communication device based on the location of the mobile communication device, by:

transmitting, through the network to a plurality of application mapping servers, queries for application programs related to the services located within the vicinity of the mobile communication device, each query identifying at least one of the services, and each query including information identifying an application mapping server of the plurality of application mapping servers to which the query should be delivered;

receiving responses from the plurality of application mapping servers including information about application programs relevant to the services identified in the queries;

identifying whether any of the application programs relevant to the services identified in the queries are already loaded for execution within the mobile communication device;

consolidating the responses from the plurality of application mapping servers for presentation on the user interface; and presenting links to the user application programs on the user interface, based on the received information, where the links differentiate between a first user application program identified as already loaded within the mobile communication device and a second user application program identified as not already loaded within the mobile communication device.

14. The computer-readable storage media of claim 13 wherein the user application programs are each associated with metadata that is indicative of at least one classification for each user application program.

15. The computer-readable storage media of claim 14 wherein the metadata is descriptive of services to which each user application program is relevant.

16. The computer-readable storage media of claim 14 wherein the programming instructions are configured to cause the mobile communication device to locate metadata indicative of at least one classification for each service.

17. The computer-readable storage media of claim 16 wherein the programming instructions are configured to cause the mobile communication device to locate the user application programs based on matches between the services metadata and the user application program metadata.

18. The computer-readable storage media of claim 13 wherein the programming instructions are configured to cause the mobile communication device to locate the services by querying a server that is not part of the wireless mobile communication device.

19. The computer-readable storage media of claim 13 wherein the programming instructions are configured to cause the mobile communication device to locate services which include local restaurants.

20. The computer-readable storage media of claim 13 wherein the programming instructions are configured to cause the mobile communication device to locate services which include local retail stores.

21. The computer-readable storage media of claim 13 wherein the programming instructions are configured to cause the user interface to present a user-selectable icon which links to a server at which the user may acquire the second user application program identified as not already loaded within the mobile communication device.

22. The computer-readable storage media of claim 13 wherein the programming instructions are configured to cause the mobile communication device to locate user application programs without requiring any personal information about a user.

23. The computer-readable storage media of claim 13 wherein the programming instructions are configured to cause the mobile communication device to download the located second user application program identified as not already loaded within the mobile communication device and to cause the mobile communication device to execute the located second user application program.

24. The computer-readable storage media of claim 13 wherein the link to the second user application program identified as not already loaded within the mobile communication device is a link to a server from which the second user application program may be downloaded, and the link to the first user application program identified as already loaded within the mobile communication device is a link to an executable file for running the first user application program on the mobile communication device.

\* \* \* \* \*